May 7, 1946.  C. L. CONROY  2,399,791
HOSE COUPLING
Filed March 30, 1944

Inventor
Charles L Conroy.
By
Attorney

Patented May 7, 1946

2,399,791

UNITED STATES PATENT OFFICE 2,399,791

HOSE COUPLING

Charles L. Conroy, Libertyville, Ill.

Application March 30, 1944, Serial No. 528,700

1 Claim. (Cl. 285—84)

The present invention pertains to hose couplings, and more particularly to couplings for high, medium, or low pressure non-metallic flexible hose.

Generally speaking, there are two types of hose couplings of the foregoing character. In one type the coupling is permanently clamped upon the end of the hose by means of dies or special forming tools, while in the other the coupling is attached by merely threading one member of the coupling upon the other with conventional tools, such as a wrench or vise, without deforming any part of the coupling, thus making it reuseable and permitting attachment in the field, which is a great convenience.

My invention relates to the latter type of coupling, and has primarily for its object to provide a reuseable coupling which is exceedingly compact and simple in construction, and which affords maximum gripping of the end of the hose to prevent leakage or blow-offs.

Incidental to the foregoing, a more specific object of the invention resides in the provision of a coupling consisting of a threaded nipple for insertion into the end of a hose to expand the same, and a sleeve surrounding the hose and provided with internal threads of the same pitch as those of the nipple, said sleeve having a threaded connection with the nipple and an internally restricted outer end for engaging and compressing a portion of the expanded end of the hose upon the nipple intermediate its ends.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1:
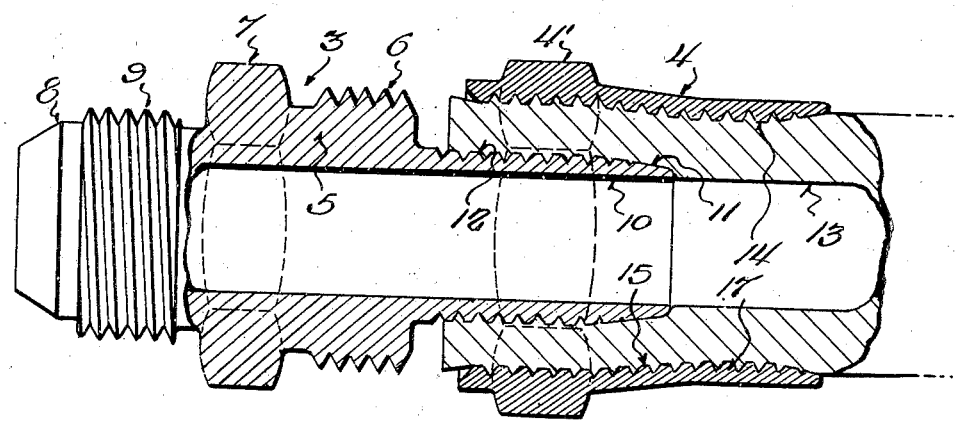
Fig. 1 is a longitudinal sectional view of a coupling constructed in accordance with a preferred form of the invention, the parts being shown in assembled position prior to attachment of the coupling with suitable tools.

Referring now particularly to the accompanying drawing, the coupling illustrated consists of two members, namely, a connector 3, and a clamping sleeve or shell 4. The connector consists of a head 5, the inner end of which is provided with external threads 6, while the outer enlarged end is provided with a hexagonal or other shaped tool receiving surface 7.

The connector 3 may be provided with either a male or female attaching end. In the present instance a male extension 8 having an external thread 9 for reception of a female member is illustrated.

The head 5 is provided with a rearwardly extending nipple 10 tapered at its outer end 11 and provided with external threads 12, substantially conforming in pitch to the threads 6 of the head 5. As best shown in Fig. 1, the nipple 10 is partially inserted into the end of a hose 13, this operation being accomplished manually by turning the nipple into the hose until such time as the hose end almost contacts the enlarged portion and friction or bind between the hose and nipple, resulting from expansion of the hose, reaches a point where further insertion cannot be accomplished by hand.

The sleeve 4, which has previously been positioned on the hose 13, is then manually threaded forward on the hose until such time as the internally restricted end 14 encounters the expanded portion of the hose and creates sufficient friction or bind to prevent further advancement of the sleeve by hand.

Figure 2:
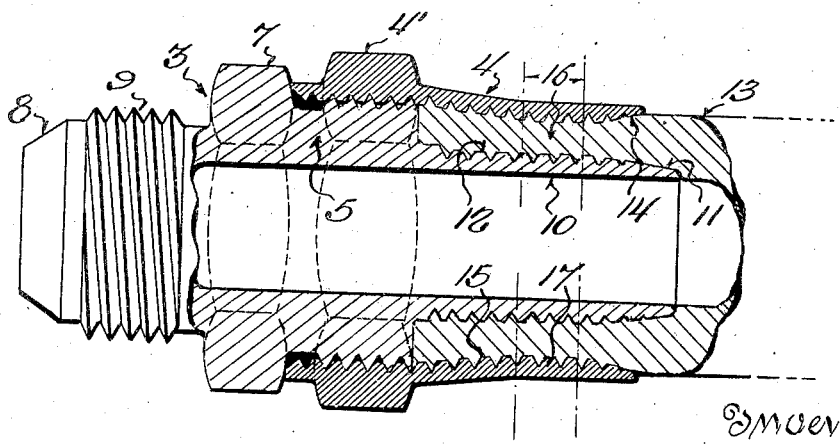
Fig. 2 is a similar view illustrating complete attachment of the coupling.

After the parts have been assembled in the manner thus far described, either the sleeve 4 or the hexagonal portion 7 of the connector 3 are clamped in a vise, and a wrench is then applied to the other member, which upon rotation, will cause the sleeve 4 to travel forwardly on the expanded portion of the hose until it engages the threads 6 formed on the head. During this operation the inner annular taper 15 formed between the ends of the sleeve co-operates with the tapered end 11 of the nipple or insert 10 to compress a portion of the hose to the extent that sufficient friction is created between the hose and sleeve 4, to cause the hose to turn on the nipple and travel forward with the sleeve until it abuts the face of the head 5 as shown in Fig. 2. This action occurs because of the similarity in pitch of the threads between the nipple and sleeve.

When the foregoing occurs, the sleeve 4 continues to travel forwardly on the threads 6 of the head 5 until such time as the internal taper 15 of the sleeve 4 passes the tapered end 11 of the nipple, which serves to pack and compress the end of the hose against the face of the head and into the threads of the sleeve and nipple.

In the final assembled position of the sleeve 4, a portion of its internally restricted end and the taper 15, has passed the tapered end 11 of the nipple to create a zone 16 of maximum compression, which insures clamping of the hose to the extent that possible leakage or blow-off is reduced to a minimum, as the pressure thus created is so great that the hose itself must rupture before this could occur.

While the present coupling is particularly designed for medium or high pressure hose, which is usually provided with several layers of either fabric or metallic braided reinforcement, or a combination of both, it is equally applicable to low pressure hose having light reinforcement.

It will be further noted that the zone of maximum compression occurs intermediate the ends of the sleeve and insert, from which point the sleeve and insert are relatively flared to allow the hose to gradually assume its normal thickness beyond the coupling, thus reducing rupture of the hose at the end of the coupling, as a result of pulsation or bending of the hose, to a minimum.

From the foregoing explanation, considered in connection with the accompanying drawing, it will be apparent that an exceedingly simple, inexpensive and compact reuseable coupling has been provided, which consists of only two parts, streamlined to avoid undue projections and present a pleasing proportional design, and which can be assembled in a minimum length of time using only ordinary simple hand tools such as a vise and wrench or two wrenches. No special tools are required to apply this coupling.

Also, in as much as the coupling has a continuous bore substantially equal to that of the hose, maximum capacity is obtained with minimum internal friction.

I claim the following:

A hose coupling of the character described, comprising, a connector consisting of a threaded head provided with a threaded nipple having a tapered end for insertion into the end of a hose to expand the same, the threads on said head and nipple being of substantially the same pitch, and a sleeve surrounding the end of said hose to circumferentially compress said expanded end of hose over said nipple and having an internal thread of substantially the same pitch as that of the threads on said nipple and head, said sleeve being threaded on said head and having a restricted internal diameter intermediate its ends for cooperating with the nipple, engaging and radially compressing a portion of the expanded end of said hose intermediate the ends of said nipple to a greater degree than the compression of the end of said hose, to anchor the end of the hose against axial movement incident to the pressure of the nipple on the end of the hose.

CHARLES L. CONROY.